(12) United States Patent
Verelst et al.

(10) Patent No.: US 9,623,845 B2
(45) Date of Patent: Apr. 18, 2017

(54) WIPER BLADE ADAPTER DEVICE

(71) Applicant: Robert Bosch GmbH, Stuttgart (DE)

(72) Inventors: Hubert Verelst, Lubbeek (BE); Jan Bonroy, Heverlee (BE); Christian Wilms, Beringen-Koersel (BE)

(73) Assignee: Robert Bosch GmbH, Stuttgart (DE)

( * ) Notice: Subject to any disclaimer, the term of this patent is extended or adjusted under 35 U.S.C. 154(b) by 383 days.

(21) Appl. No.: 13/928,926

(22) Filed: Jun. 27, 2013

(65) Prior Publication Data

US 2014/0000055 A1    Jan. 2, 2014

(30) Foreign Application Priority Data

Jun. 27, 2012  (DE) .................. 10 2012 210 932

(51) Int. Cl.
  *B60S 1/38*    (2006.01)
  *B60S 1/40*    (2006.01)

(52) U.S. Cl.
  CPC .............. *B60S 1/4003* (2013.01); *B60S 1/387* (2013.01); *B60S 1/3855* (2013.01); *B60S 1/3858* (2013.01)

(58) Field of Classification Search
  CPC .................. B60S 1/3855; B60S 1/3858; B60S 1/3874–1/3881; B60S 1/3853; B60S 1/3856
  USPC ....................................... 15/250.32
  See application file for complete search history.

(56) References Cited

U.S. PATENT DOCUMENTS 6,625,842 B1 * 9/2003 De Block ............. B60S 1/3849
                                                        15/250.32
2008/0078051 A1 * 4/2008 Herring ................. B60S 1/3851
                                                        15/250.001
2008/0222829 A1 * 9/2008 Chiang .................... B60S 1/386
                                                        15/250.32
2008/0289133 A1 * 11/2008 Kim ........................ B60S 1/387
                                                        15/250.32
2009/0199357 A1 * 8/2009 Thienard ............... B60S 1/3853
                                                        15/250.32
2009/0223010 A1 * 9/2009 Richey .................... B60S 1/381
                                                        15/250.32
2010/0186185 A1 * 7/2010 Grasso ................... B60S 1/387
                                                        15/250.32
2010/0293737 A1 * 11/2010 Ollier .................... B60S 1/3858
                                                        15/250.34

(Continued)

FOREIGN PATENT DOCUMENTS

EP       2020351 A1 * 2/2009 ............ B60S 1/3853
WO  WO 2008003675 A1 * 1/2008 ............. B60S 1/386
WO  WO 2010086064 A1 * 8/2010 ............. B60S 1/386

OTHER PUBLICATIONS

WO2010086064A1 (machine translation), 2010.*

*Primary Examiner* — Andrew A Horton
(74) *Attorney, Agent, or Firm* — Michael Best & Friedrich LLP

(57) ABSTRACT

A wiper blade adapter device with at least one basic adapter (10*a*; 10*b*), which is provided for coupling to a spring rail (14*a*; 14*b*), and with a special adapter (12*a*; 12*b*), which is provided for coupling to a wiper arm adapter and, in a fitted state, is connected immovably to the basic adapter (10*a*; 10*b*). The wiper blade adapter device comprises a latching unit (16*a*; 16*b*) which is provided for producing a latching connection between the basic adapter (10*a*; 10*b*) and the special adapter (12*a*; 12*b*).

15 Claims, 2 Drawing Sheets

(56) References Cited

U.S. PATENT DOCUMENTS

2012/0317741 A1* 12/2012 Benner ................ B60S 1/3858
15/250.32

* cited by examiner

WIPER BLADE ADAPTER DEVICE

BACKGROUND OF THE INVENTION

The invention is based on a wiper blade adapter device.

A wiper blade adapter device with at least one basic adapter, which is provided for coupling to a spring rail, and with a special adapter, which is provided for coupling to a wiper arm adapter, wherein, in a fitted state, the special adapter is connected immovably to the basic adapter, is already known.

SUMMARY OF THE INVENTION

The invention is based on a wiper blade adapter device with at least one basic adapter, which is provided for coupling to a spring rail, and with a special adapter, which is provided for coupling to a wiper arm adapter and, in a fitted state, is connected immovably to the basic adapter.

It is proposed that the wiper blade adapter device comprises a latching unit which is provided for producing a latching connection between the basic adapter and the special adapter, thus enabling particularly rapid installation of different wiper arm adapter systems to be undertaken. A "basic adapter" in this context is to be understood as meaning, in particular, an adapter which has a contact region for a special adapter and which is connectable captively to the special adapter and is furthermore provided to provide a coupling region of a wiper blade component of a wiper blade, such as, in particular, of a spring rail, a wiper strip, a wind deflector element and/or a wiper lip, for coupling and/or contact connection to the special adapter. "Coupling" in this context is to be understood as meaning, in particular, a connection, in particular a releasable connection. A "spring rail" in this context is to be understood as meaning, in particular, an element which has at least one extent which, in a normal operating state, is elastically changeable by at least 10%, in particular by at least 20%, preferably by at least 30% and, particularly advantageously, by at least 50% and which, in particular, produces a counterforce which is dependent on a change in the extent and opposes the change. An "extent" of an element in this context is to be understood as meaning, in particular, a maximum distance between two points of a perpendicular projection of the element onto a plane. The spring rail is preferably at least partially composed of spring steel. In an unloaded state, the spring rail is preferably substantially in the shape of a bent rod and, particularly advantageously, of a flattened, bent rod. Particularly advantageously, a curvature of the spring rail along a longitudinal extent in an unloaded state is greater than a curvature of a vehicle surface of a motor vehicle, in particular a vehicle window, over which the spring rail is guided in at least one operating state. A "special adapter" in this context is to be understood as meaning, in particular, an adapter which is provided for connecting the basic adapter to a wiper arm and/or to a wiper arm adapter. In particular, the special adapter is provided for providing a coupling region for coupling a wiper arm and/or a wiper arm adapter. "Immovably" in this context is to be understood as meaning, in particular, rigidly, fixedly and/or stiffly. A "latching unit" in this context is to be understood as meaning, in particular, a unit which comprises at least one latching element. A "latching element" in this context is to be understood as meaning, in particular, a spring elastic element for producing a latching connection, said element being provided so as to be elastically deflected during installation. "Provided" is to be understood as meaning, in particular, specially designed and/or equipped.

In a further refinement of the invention, it is proposed that the latching unit has at least one latching recess and at least one latching element, wherein the latching recess is arranged within the special adapter and the latching element is arranged on the basic adapter, thus enabling particularly stable coupling between the special adapter and the basic adapter to be achieved, with production being simple at the same time. A "latching recess" in this context is to be understood as meaning, in particular, a recess which is provided for receiving the at least one latching element.

Furthermore, it is proposed that the at least one latching element has a drop shape, thereby enabling a particularly simple latching in operation to be obtained. A "drop shape" in this context is to be understood as meaning, in particular, a three dimensional shape which is substantially spherical on one side and ends in a point and/or in a tapering manner on another side.

Furthermore, it is proposed that the at least one latching element is formed integrally with the basic adapter, thus enabling a particularly stable connection of the latching element on the basic adapter to be achieved. "Integrally" is to be understood as meaning, in particular, integrally bonded, such as, for example, by a welding process and/or adhesive bonding process, etc., and, particularly advantageously as meaning molded on, such as through production by casting and/or production in a single or multi component injection molding process.

In a further refinement of the invention, it is proposed that the latching unit has at least one latching recess and at least two latching elements, wherein the latching recess is arranged within the basic adapter and the at least two latching elements are arranged on the special adapter, thus enabling a particularly rapid and, at the same time, stable installation of the special adapter on the basic adapter to be achieved.

A particularly compact construction of the latching unit can be achieved if at least the two latching elements each have a latching lug, the free ends of which face away from each other. A "latching lug" in this context is to be understood as meaning a part of a latching element that forms a free end of the latching element. In particular, in a fitted state, the latching lug forms an interlocking connection in an installation direction with a component which is to be coupled. An installation direction in this context is to be understood as meaning, in particular, a direction in which the latching element is moved into the latching recess during an installation operation. In particular, the latching recess is open in the installation direction.

Furthermore, it is proposed that the at least two latching elements are arranged in the same latching recess, thus enabling production costs to be advantageously reduced.

Furthermore, it is proposed that the latching recess is formed by an elongated hole, as a result of which particularly rapid and simple production of the latching recess can be obtained. The elongated hole advantageously extends in a main direction of extent at least substantially parallel to a longitudinal direction of the basic adapter. "At least substantially" in this context is to be understood as meaning, in particular, a deviation of less than 20°, preferably of less than 10°, particularly preferably of less than 5°, and very particularly preferably of 0°. In addition, it is conceivable for the elongated hole to be bounded in the longitudinal direction by angled portions.

The special adapter can be coupled in a particularly stable manner to the basic adapter if, in a fitted state, the special adapter is welded to the basic adapter. Various welding processes appearing expedient to a person skilled in the art can be taken into consideration here, such as, in particular, laser welding processes or, preferably, ultrasonic welding processes.

BRIEF DESCRIPTION OF THE DRAWINGS

Further advantages emerge from the description below of the drawing. The drawing illustrates two exemplary embodiments of the invention. The drawing, the description and the claims contain numerous features in combination. A person skilled in the art will expediently also consider the features individually and put them together to form useful further combinations.

In the drawing.

DETAILED DESCRIPTION

Figure 1:
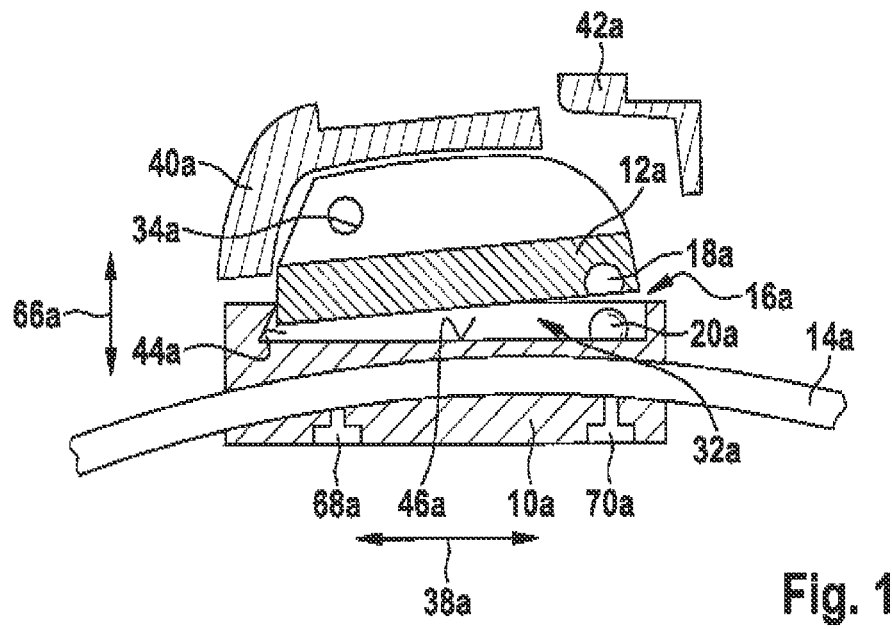
FIG. 1 shows a wiper blade adapter device according to the invention in a sectional illustration.

FIG. 1 shows a wiper blade adapter device according to the invention with a basic adapter 10a, which is provided for coupling to a spring rail 14a. The wiper blade device is provided for wiping a vehicle window (not illustrated specifically). For this purpose, the wiper blade device has further wiper blade components, which are not denoted specifically and are already known from the prior art, such as, in particular, a wiper strip, a wiper lip, at least one end cap and/or a wind deflector element. The wiper blade device is basically useable in the front region or in the rear region of a vehicle, in particular of a motor vehicle. However, other areas of use of the wiper arm device and of the wiper blade device that appear expedient to a person skilled in the art, such as, in particular, in the air travel sector, rail sector and/or sea travel sector, are also conceivable.

The spring rail 14a is partially composed of a spring steel. Furthermore, in an unloaded state, the spring rail 14a is substantially in the shape of a flattened, bent rod. A curvature of the spring rail 14 along a longitudinal extent is greater in an unloaded state than a curvature of a vehicle window of a motor vehicle, over which the spring rail 14a is guided in an operating state.

Figure 2:
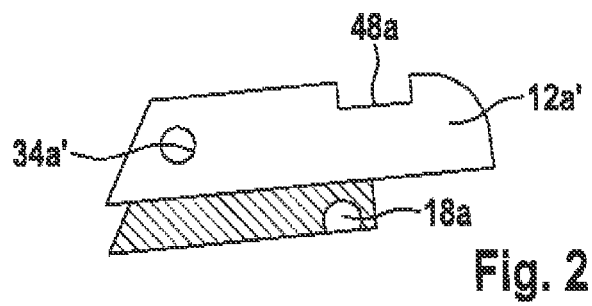
FIG. 2 shows an alternative configuration of a special adapter for the wiper blade adapter device according to FIG. 1 in a sectional illustration.

The wiper blade adapter device furthermore has a special adapter 12a, which is provided for coupling to a wiper arm adapter (not shown specifically) of the "top lock" type. For the coupling to the wiper arm adapter, the special adapter 12a has a coupling recess 34a which is formed by a bore which extends substantially parallel to a wiping direction. FIG. 2 illustrates an alternatively configured special adapter 12a'. The special adapter 12a' has both a coupling recess 34a' and a coupling groove 48a. The coupling groove 48a runs parallel to the wiping direction. The special adapter 12a' is provided for coupling to a wiper arm adapter (not shown specifically) of the "side lock" type.

The wiper device runs perpendicularly to a longitudinal direction 38a of the basic adapter 10a and perpendicularly to the sectional plane. Furthermore, the special adapter 12a has two cover elements 40a, 42a. The cover elements 40a, 42a are provided for protecting the special adapter 12a and the wiper arm adapter against external influences and also for improving a visual impression of the wiper blade adapter device. Furthermore, the cover elements 40a, 42a are connected to the special adapter 12a and/or to the basic adapter 10a in a manner (not shown specifically) appearing expedient to a person skilled in the art.

The basic adapter 10a has a contact region 32a with respect to the special adapter 12a. Furthermore, the basic adapter 10a comprises a coupling region for the spring rail 14a. The special adapter 12a is captively connectable to the basic adapter 10a. For this purpose, the basic adapter 10a has a stop surface 44a onto which the special adapter 12a is placed during an installation operation. The stop surface 44a is inclined with respect to the longitudinal direction 38a. The stop surface 44a runs parallel to the wiping direction. Furthermore, the stop surface 44a faces a coupling region of the spring rail 14a. A supporting surface 46a of the basic adapter 10a, which supporting surface runs parallel to the longitudinal direction 38a, serves for supporting the special adapter 12a in a fitted state. The stop surface 44a and the supporting surface 46a here enclose an acute angle.

Furthermore, the wiper blade adapter device comprises a latching unit 16a, which is provided for producing a latching connection between the basic adapter 10a and the special adapter 12a. For this purpose, the latching unit 16a has a latching recess 18a and a latching element 20a. The latching recess 18a is arranged within the special adapter 12a. The latching recess 18a is arranged here, as viewed in the longitudinal direction 38a, on a side of the special adapter 12a that is opposite the stop surface 44a. The latching element 20a is arranged on the basic adapter 10a. During an installation operation, the latching recess 18a receives the latching element 20a.

The latching element 20a has a drop shape. The latching element 20a here is of spherical design on one side and ends in a tapering manner on another side. The latching recess 18a likewise has a drop shape which corresponds to the drop shape of the latching element 20a. The latching element 20a is formed integrally with the basic adapter 10a. The latching element 20a here is formed together with the basic adapter 10a in a single component injection molding process.

During an installation operation, the special adapter 12a is placed onto the stop surface 44a and is subsequently pivoted relative to the basic adapter 10a. During the pivoting operation, the special adapter 12a reaches behind the basic adapter 10a in the region of the stop surface 44a. The latching element 20a engages in the latching recess 18a and latches therein. Finally, the special adapter 12a bears in a planar manner against the stop surface 44a and against the supporting surface 46a. The special adapter 12a is prevented by means of the latching unit 16a from being pushed back. In the fitted state, the special adapter 12a is therefore connected immovably to the basic adapter 10a. However, by means of an increased expenditure of force, a retaining force of the latching unit 16a can be overcome and the special adapter 12a can be released from the basic adapter 10a. Alternatively, a non releasable connection of the special adapter 12a to the basic adapter 10a can also be produced. For this purpose, the special adapter 12a when fitted to the basic adapter 10a is welded in an ultrasonic welding process.

For the welding operation, channels 68a, 70a which extend in a main direction of extent parallel to a vertical direction 66a are let into a lower side of the basic adapter 10a. The channels 68a, 70a are provided for receiving sonotrodes and for guiding the melt produced to the spring rail 14a, as a result of which the latter is fixed in the longitudinal direction 38a with respect to the basic adapter 10a.

Figure 3:
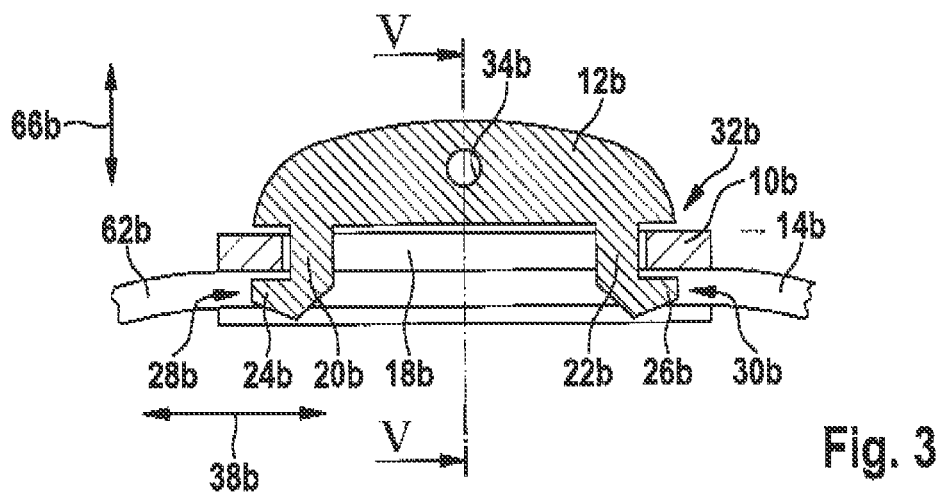
FIG. 3 shows a further exemplary embodiment of a wiper blade adapter device according to the invention in a sectional illustration.
Figure 4:
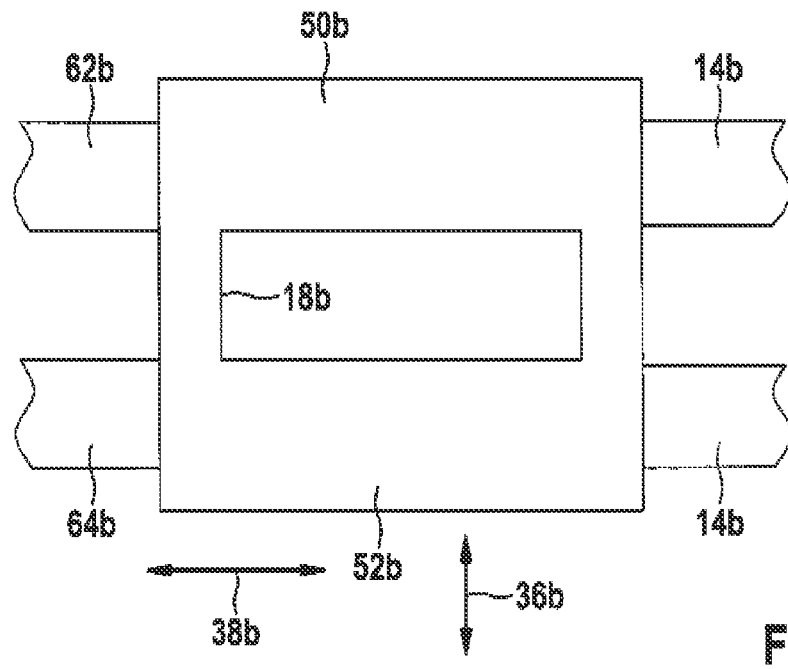
FIG. 4 shows a top view of a spring rail and of a basic adapter of the wiper blade adapter device according to FIG. 3.
Figure 5:
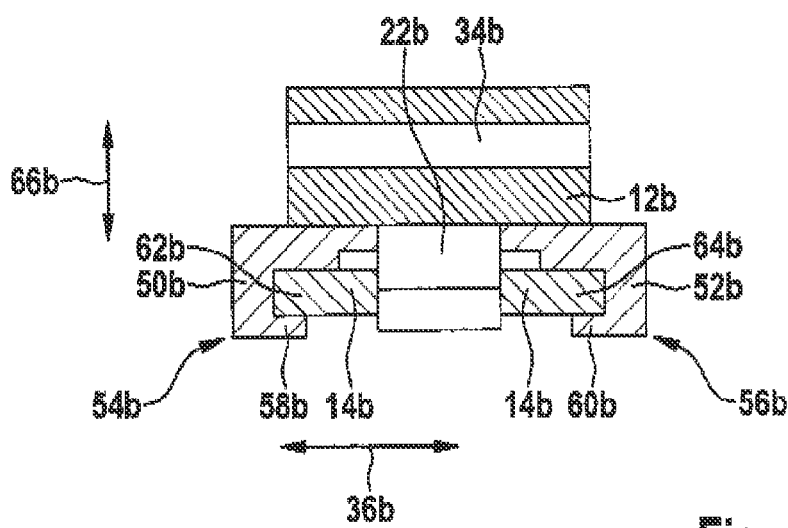
FIG. 5 shows a sectional illustration of the wiper blade adapter device from FIG. 3 through V V.

FIGS. 3 to 5 show a further exemplary embodiment of the invention. The descriptions below and the drawings are restricted essentially to the differences between the exemplary embodiments and, with regard to like components, in particular with regard to components having the same reference signs, reference can basically also be made to the drawings and/or to the description of the other exemplary embodiment, in particular in FIGS. 1 and 2. In order to differentiate between the exemplary embodiments, the letter a in the reference signs of the exemplary embodiment in FIGS. 1 and 2 has been adjusted. In the exemplary embodiment of FIGS. 3 to 5, the letter a has been replaced by the letter b.

FIG. 3 shows a wiper blade adapter device according to the invention with a basic adapter 10b, which is provided for coupling to a spring rail 14b. The spring rail 14b here is formed in two parts from two spring rail parts 62b, 64b which run parallel to each other. The wiper blade adapter device furthermore has a special adapter 12b, which is provided for coupling to a wiper arm adapter (not shown specifically).

The basic adapter 10b has a contact region 32b with respect to the special adapter 12b. Furthermore, the basic adapter 10b comprises a coupling region for the spring rail 14b. The special adapter 12b is captively connectable to the basic adapter 10b. For the coupling to the wiper arm adapter, the special adapter 12b has a coupling recess 34b, which is formed by a bore which extends substantially parallel to a wiping direction 36b.

As shown in FIGS. 4 and 5, the basic adapter 10b has two side walls 50b, 52b extending in a longitudinal direction 38b. Receiving walls 58b, 60b, the free ends of which face each other, are respectively arranged on wiper blade side end regions 54b, 56b. The special adapter 12b is not illustrated in FIG. 4 for reasons of clarity. In a fitted state, the side walls 50b, 52b and the receiving walls 58b, 60b bear against the spring rail parts 62b, 64b and avoid a movement of the spring rail parts 62b, 64b in the wiping direction 36b and in a vertical direction 66b. The vertical direction 66b extends perpendicularly to the wiping direction 36b and perpendicularly to the longitudinal direction 38b.

The wiper blade adapter device comprises a latching unit 16b which is provided for producing a latching connection between the basic adapter 10b and the special adapter 12b. For this purpose, the latching unit 16b has a latching recess 18b and two latching elements 20b, 22b. The latching recess 18b is arranged within the basic adapter 10b. In this case, the latching recess 18b is formed by an elongated hole. The elongated hole extends in a main direction of extent parallel to the longitudinal direction 38b of the basic adapter 10b.

The two latching elements 20b, 22b are arranged on the special adapter 12b. During an installation operation, the latching recess 18b receives the latching elements 20b, 22b. The two latching elements 20b, 22b are therefore arranged in just one latching recess 18b. The two latching elements 20b, 22b each have a latching lug 24b, 26b, the free ends 28b, 30b of which face away from each other. The latching lugs 24b, 26b are molded as extensions onto the latching elements 20b, 22b and therefore form the free ends 28b, 30b of the latching elements 20b, 22b. In a fitted state, the latching elements 20b, 22b bear against the spring rail parts 62b, 64b in the wiping direction 36b and avoid a movement of the spring rail parts 62b, 64b towards each other in the wiping direction 36b (FIG. 5). In the fitted state, the latching lugs 24b, 26b form an interlocking connection with the basic adapter 10b in an installation direction which runs parallel to the vertical direction 66b.

During an installation operation, the special adapter 12b is placed in the installation direction onto the basic adapter 10b. The latching elements 20b, 22b are elastically deflected here out of a starting position. If an end position of the special adapter 12b on the basic adapter 10b is reached, the latching elements 20b, 22b move in a spring elastic manner back into the starting position. The latching lugs 24b, 26b reach here behind walls of the basic adapter 10b, the walls bounding the latching recess 18b, and therefore avoid a movement of the special adapter 12b in the vertical direction 66b relative to the basic adapter 10b.

Release of the special adapter 12b is avoided by means of the latching unit 16b. In the fitted state, the special adapter 12b is therefore connected immovably to the basic adapter 10b. However, by steering the latching elements 20b, 22b back, the special adapter 12b can be released again from the basic adapter 10b. Alternatively, a non releasable connection of the special adapter 12b to the basic adapter 10b can also be produced. For this purpose, the special adapter 12b when fitted to the basic adapter 10b is welded in an ultrasonic welding process.

What is claimed is:

1. A wiper blade adapter device with at least one basic adapter (10a; 10b) configured to be coupled directly to a spring rail (14a; 14b), the wiper blade adapter device also including a special adapter (12a; 12b), which is provided for coupling to a wiper arm adapter and, in a fitted state, is connected immovably to the basic adapter (10a; 10b), characterized by a latching unit (16a; 16b) which is provided to produce a latching connection between the basic adapter (10a; 10b) and the special adapter (12a; 12b), wherein the basic adapter (10a; 10b) includes a planar supporting surface (46a) and a stop surface (44a) that extends at an acute angle relative to the supporting surface (46a) and converges with the supporting surface (46a) to form a V-shape, such that to couple the special adapter (12a; 12b) to the basic adapter (10a; 10b), the special adapter (12a; 12b) is placed onto a contact point adjacent the stop surface (44a), and is subsequently pivoted relative to the basic adapter (10a; 10b) about the contact point until a portion of the special adapter (12a; 12b) extends underneath the stop surface (44) such that the special adapter (12a; 12b) is prevented from being moved away from the basic adapter (10a; 10b), wherein the latching unit (16a; 16b) includes at least one latching element (20a) that is a projection that extends from the supporting surface (46a) and is received in a corresponding recess (18a) in the special adapter (12a; 12b), and wherein the basic adapter (10a; 10b) is elongated in a longitudinal direction (38a), and wherein the supporting surface (46a) includes a first portion longitudinally to the left of the latching element (20a) and a second portion longitudinally to the right of the latching element (20a).

2. The wiper blade adapter device according to claim 1, characterized in that the at least one latching element (20a) has a rounded drop shape.

3. The wiper blade adapter device according to claim 1, characterized in that the at least one latching element (20a) is formed integrally with the basic adapter (10a).

4. The wiper blade adapter device according to claim 1, characterized in that, in a fitted state, the special adapter (12a; 12b) is welded to the basic adapter (10a; 10b).

5. A wiper blade with a wiper blade adapter device according to claim 1, wherein the wiper blade comprises a spring rail (14a; 14b), and wherein the basic adapter (10a; 10b) is coupled directly to the spring rail (14a; 14b).

6. The wiper blade according to claim 5, characterized in that, in a fitted state, the special adapter (12a; 12b) is welded to the basic adapter (10a; 10b).

7. The wiper blade according to claim 5, wherein both the supporting surface 46(a) and the stop surface (44a) are planar surfaces.

8. The wiper blade according to claim 5, wherein the at least one latching element (20a) is spaced from the stop surface (44a) along the longitudinal direction (38a) of the basic adapter (10a; 10b).

9. The wiper blade according to claim 5, wherein the stop surface (44a) faces toward an opening in the basic adapter (10a) that receives the spring rail (14a; 14b).

10. The wiper blade according to claim 5, wherein the special adapter (12a; 12b) is elongated along the longitudinal direction (38a) and includes a first terminal end and a second terminal end spaced from the first terminal end by a distance along the longitudinal direction (38a), and wherein the planar supporting surface (46a) extends along more than half of the distance.

11. The wiper blade adapter according to claim 1, wherein both the supporting surface (46a) and the stop surface (44a) are planar surfaces.

12. The wiper blade adapter according to claim 1, wherein the at least one latching element (20a) is spaced from the stop surface (44a) along the longitudinal direction (38a) of the basic adapter (10a; 10b).

13. The wiper blade adapter according to claim 1, wherein the stop surface (44a) faces toward an opening in the basic adapter (10a) that receives a spring rail (14a; 14b).

14. The wiper blade according to claim 1, wherein the special adapter (12a; 12b) is elongated along the longitudinal direction (38a) and includes a first terminal end and a second terminal end spaced from the first terminal end by a distance along the longitudinal direction (38a), and wherein the planar supporting surface (46a) extends along more than half of the distance.

15. The wiper blade according to claim 1, wherein the stop surface extends from the contact point to where the stop surface converges with the supporting surface.

* * * * *